Patented July 27, 1954

2,684,956

UNITED STATES PATENT OFFICE 2,684,956

ANTIMONY MERCAPTIDE COMPOUNDS AND COMPOSITIONS CONTAINING SAME

Elliott L. Weinberg, Long Island City, N. Y., and Clarence Kenneth Banks and Ernest W. Johnson, Westfield, and Carl R. Gloskey, Avenel, N. J., assignors to Metal & Thermit Corporation, New York, N. Y., a corporation of New Jersey No Drawing. Application February 25, 1952, Serial No. 273,362

8 Claims. (Cl. 260—31.8)

The present invention relates to antimony mercaptide compounds having particular utility as stabilizing agents for resins and the like, and to processes for manufacturing the same.

In accordance with the present invention the new group of antimony mercaptide compounds may be generally designated as condensation products of trivalent antimony compounds with mercaptans. More particularly these compounds may be illustrated by the following structural formula:

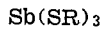

$$Sb(SR)_3$$

wherein R is an alkyl, aryl or aralkyl group.

The antimony mercaptides of the present invention are stabilizers for resins, particularly vinyl chloride containing resins, when dispersed in the resins at low concentrations such as 2 parts of antimony mercaptide per 100 parts of resin. This stabilizing property is equally applicable to resin-plasticizer compositions, such as those containing the phthalate type plasticizers.

These compounds may be prepared in any suitable manner. It has been found, however, that these novel products may be prepared in high yield and purity by reacting a trivalent antimony compound with a mercaptan, and recovering a mercaptide having the desired Sb—S linkage. More specifically, a trivalent antimony compound selected from the group consisting of the trioxides and trihalides, may be condensed with a mercaptan to produce products of the above structural formula.

The reaction mechanim for the formation of the antimony mercaptides using antimony trioxides is clearly illustrated by the following equation:

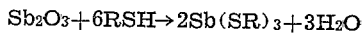

$$Sb_2O_3 + 6RSH \rightarrow 2Sb(SR)_3 + 3H_2O$$

This equation graphically shows that the reaction occurs between the mercapto radical and the antimony oxide whereby water splits off and a chemical bond is formed between the antimony and the sulfur. It further illustrates the necessity of six molecules of the mercapto compound per mole of antimony oxide in order to obtain the desired reaction.

Similarly thereto, the reaction mechanism with the halide is represented below:

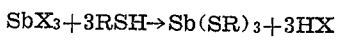

$$SbX_3 + 3RSH \rightarrow Sb(SR)_3 + 3HX$$

wherein X represents a halide such as chlorine, bromine, or iodine. In this reaction a halide acid splits off in lieu of water, only three molecules of the mercaptan being necessary per mole of antimony halide in order to obtain the antimony mercaptide.

It is within the scope of this invention that pure, impure or commercial grades of the reactants may be employed satisfactorily. In general, pure compounds of the above formulas may be prepared from pure raw materials. However, these novel compounds may be diluted with innocuous, inert materials, thereby permitting the use of technical materials or intermediates in their preparation.

Any suitable reaction temperatures may be employed. It is ordinarily preferred to use room temperature due to the exothermicity of the reaction. However, the presence of the water or the halide acid produced by the condensation reaction usually requires an additional heating or refluxing in order to strip said water or acid from the reaction product, though it may be removed in any suitable manner.

Another embodiment of this invention is the use of inert organic solvents as the medium for the reaction, such as toluene, benzene, methyl alcohol, etc. The presence of such solvent facilitates the desired reaction. The solvent may be eliminated from the reaction product at the completion of the reaction by any suitable means. This may be accomplished by vaporizing the solvent under vacuum at elevated temperatures.

The following examples are further illustrative of these antimony mercaptides and their preparation, and it will be understood that the invention is not limited thereto:

EXAMPLE I

One mole of antimony trioxide was mixed with six moles of lauryl mercaptan and 200 ml. of toluene. This mixture was stirred and refluxed to remove the water of reaction. The initially opaque slurry was transformed into a clear solution after the theoretical three moles of water were removed. The solution was then filtered to remove solid contaminants and then stripped of toluene by distillation in vacuo (pot temperature 110° C., pressure 25 mm.). The residue was antimony tri-laurylmercaptide.

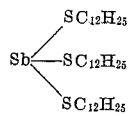

EXAMPLE II

One-half mole of antimony trioxide as mixed with three moles of phenyl mercaptan (thiophenol) and 100 ml. of toluene. This mixture was stirred and refluxed to remove the water of reaction. After theoretical water had been removed, the solution was filtered to remove solid contaminants and stripped of toluene by distillation in vacuo. The residue was antimony triphenylmercaptide.

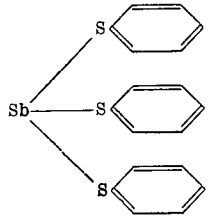

EXAMPLE III

One mole of antimony trichloride and three moles of n-octylmercaptan were heated (at about 200° C. and atmospheric pressure) until no more HCl gas evolved. Residual HCl was removed by treatment with anhydrous ammonia. After filtering the liquid, there remained antimony tri-n-octyl mercaptide.

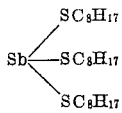

It has also been discovered and is a feature of this invention that the antimony mercaptides will function as stabilizers for resin compositions, particularly vinyl chloride-containing resin compositions containing plasticizers, and when intimately dispersed therein, will provide plastic compositions of improved resistance to heat deterioration. Films are obtained from the aforesaid plastic compositions which exhibit a high degree of stability. The weight of antimony mercaptide in a particular composition may be as low as 1% of the weight of resin; more complete stabilization is achieved by larger additions of antimony mercaptide up to about 5% of the weight of resin. We prefer to use about 2% of antimony mercaptide based on the weight of resin. The resin composition containing this concentration of stabilizer produces a stable plastic film, which does not darken at elevated temperatures as evidenced by the results of the heat tests in the table.

The vinyl resins employed were polyvinyl chloride resins. The stabilizer was incorporated into a mixture of 100 parts by weight of resin and 50 parts by weight of the plasticizer, dioctyl phthalate.

The mixture was then milled for 5 minutes on a two-roll differential speed mill heated to 320 to 325° F., and removed as a sheet. Portions of the sheet were then placed in a single cavity mold (6" by 6" by 40 mils), and preheated to 275° F. The mold was placed on a press and raised to 300° F. under 10,000 pounds total pressure. When the mold reached 320° F. the pressure was increased to 40,000 pounds and held at that same temperature. This procedure required five to five and one-half minutes. The mold and press plates were then cooled and the pressed sheet removed.

The pressed sheet was cut into one inch by six-inch strips and placed in clips on a tray so that the strips would hang vertically. The tray was then placed in a circulating air oven held at 320° F. and the samples subjected to heat aging therein. The unstabilized film was subjected to the same period of heat aging as the stabilized films in order to give reliable comparative results.

Table

| Composition | | | Appearance after heat aging |
|---|---|---|---|
| 2 parts stabilizer | 100 parts resin | 50 parts plasticizer | |
| None | Geon 101 (from B. F. Goodrich Co.—polyvinyl chloride resin). | dioctylphthalate. | black. |
| None | Ultron 300 (From Monsanto Chemical Co.—polyvinyl chloride resin). | Same | Do. |
| Antimony trilauryl mercaptide. | Geon 101 | Same | light tan. |
| Same | Ultron 300 | Same | Do. |
| Antimony triphenyl mercaptide. | Geon 101 | Same | Do. |
| Same | Ultron 300 | Same | Do. |
| Antimony Tri-octyl mercaptide. | Geon 101 | Same | Do. |
| Same | Ultron 300 | Same | Do. |

This table clearly discloses the stabilizing activity of these antimony mercaptides in comparison to an unstabilized resin film, as evidenced by the light tan color of the film stabilized with the antimony mercaptides as against the black color of the unstabilized resin film.

Other antimony mercaptides useful for polyvinyl chloride resin compositions include those prepared from ethyl, propyl, butyl, hexyl, nonyl, tetradecyl, octadecyl or other alkyl mercaptans, thiocresol, benzyl mercaptan and phenylethyl mercaptan.

Other uses of the organo-antimony mercaptides are as stabilizers for other chlorinated materials, as rubber accelerators, rubber antioxidants, lube oil additives and polymerization accelerators.

While the invention has been described with reference to various examples and embodiments, it will be apparent to those skilled in the art that various modifications may be made, and equivalents substituted therefor, without departing from the principles and true nature of the present invention.

What is claimed by Letters Patent is:

1. A stable poly-vinyl chloride containing resin composition containing an antimony mercaptide intimately dispersed therein.

2. A stable poly-vinyl chloride resin composition containing 1–5% of an antimony mercaptide intimately dispersed therein.

3. A stable poly-vinyl chloride resin composition containing about 2% of an antimony mercaptide intimately dispersed therein.

4. A stable poly-vinyl chloride resin composition containing a plasticizer, and an antimony mercaptide as a stabilizing agent intimately dispersed therein.

5. A stable poly-vinyl chloride resin composition containing a phthalate plasticizer, and an antimony mercaptide as a stabilizing agent intimately dispersed therein.

6. A stable poly-vinyl chloride resin composition containing about 1–5% of antimony trilauryl mercaptide intimately dispersed therein.

7. A stable poly-vinyl chloride resin composition containing about 1–5% of antimony triphenyl mercaptide intimately dispersed therein.

8. A stable poly-vinyl chloride resin composition containing about 1–5% of antimony tri-n-octyl mercaptide intimately dispersed therein.

(References on following page)

References Cited in the file of this patent

UNITED STATES PATENTS

| Number | Name | Date |
|---|---|---|
| 2,510,738 | Clemence et al. | June 6, 1950 |

FOREIGN PATENTS

| Number | Country | Date |
|---|---|---|
| 111,249 | Austria | Nov. 10, 1928 |
| 542,141 | Great Britain | Dec. 29, 1941 |

OTHER REFERENCES

Clemence et al., Jour. Am. Chem. Soc., vol. 70, pages 2439–2440, July 1948.

Klement et al., Berichte, vol. 68, pages 1761–1764 (1935).

Wiley, Jour. of Org. Chem., vol. 16, page 810, May 1951.

Christiansen, Organic Derivatives of Antimony, page 198 (1925), The Chemical Catalog Co., N. T.